US010245571B2

(12) United States Patent
Abraham et al.

(10) Patent No.: US 10,245,571 B2
(45) Date of Patent: Apr. 2, 2019

(54) SMOOTHIE MACHINE AND METHODS OF MAKING SMOOTHIES

(71) Applicant: UGo Smoothies, Inc., Wilmington, DE (US)

(72) Inventors: Morgan Abraham, New York, NY (US); Mitch Schwartz, Montreal (CA)

(73) Assignee: Ugo Smoothies Incorporated, Wilmington, DE (US)

( * ) Notice: Subject to any disclaimer, the term of this patent is extended or adjusted under 35 U.S.C. 154(b) by 23 days.

(21) Appl. No.: 15/155,714

(22) Filed: May 16, 2016

(65) Prior Publication Data

US 2016/0332128 A1 Nov. 17, 2016

Related U.S. Application Data

(60) Provisional application No. 62/162,306, filed on May 15, 2015.

(51) Int. Cl.

| B01F 13/10 | (2006.01) |
|---|---|
| B01F 7/16 | (2006.01) |
| A23G 9/04 | (2006.01) |
| B01F 15/00 | (2006.01) |
| A23G 9/12 | (2006.01) |
| A23G 9/22 | (2006.01) |
| B01F 15/06 | (2006.01) |
| B08B 3/10 | (2006.01) |

(52) U.S. Cl.
CPC .......... *B01F 13/1066* (2013.01); *A23G 9/045* (2013.01); *A23G 9/12* (2013.01); *A23G 9/228* (2013.01); *B01F 7/1605* (2013.01); *B01F 13/1058* (2013.01); *B01F 15/00025* (2013.01); *B01F 15/00071* (2013.01); *B01F 15/00305* (2013.01); *B01F 15/065* (2013.01); *B08B 3/104* (2013.01); *B01F 2015/061* (2013.01)

(58) Field of Classification Search
CPC .......................... B01F 13/1066; B01F 7/1605
USPC ...................................... 366/144, 148, 177.1
See application file for complete search history.

(56) References Cited

U.S. PATENT DOCUMENTS

| 5,962,060 A * | 10/1999 | Farrell | ............... A23G 9/12 366/197 |
| 7,318,324 B2 * | 1/2008 | Ulrich | ............... A23G 9/04 366/144 |
| 2002/0131324 A1 * | 9/2002 | Farrell | ............... A23G 9/045 366/147 |

* cited by examiner

*Primary Examiner* — David L Sorkin
(74) *Attorney, Agent, or Firm* — Lewis Rice LLC

(57) ABSTRACT

Methods and systems for conveniently producing fresh smoothies, which can be tailored to the particular nutritional requirements and desires of the individual customer. The system is typically a semi-automatic or fully automatic system and may be in the form of a vending machine for smoothies. It allows a consumer to select ingredients and other options, and provides a freshly-made smoothie in a short amount of time. The system generally includes a user input apparatus for receiving orders and customer preferences, and then makes a smoothie to order, delivers the smoothie to the customer, and cleans the blending, device.

16 Claims, 6 Drawing Sheets

SMOOTHIE MACHINE AND METHODS OF MAKING SMOOTHIES

BACKGROUND OF THE INVENTION

1. Field of the Invention

The present disclosure relates generally to food production, and more specifically production of blended beverages.

2. Description of the Related Art

Many consumers today desire nutritious food options. But the rigors of modern life make convenience an important factor in dietary decisions as well. Most people simply do not have the time to shop for and prepare healthy meals and snacks, and must instead resort to fast and convenient food options, which include bottled sodas and prepackaged snack foods containing chemicals and preservatives. Unfortunately, those foods chosen for convenience do not generally provide nutritional value, as they lack fruits, vegetables, and other components of a balanced diet. Fast food and unhealthy snack foods have contributed to an obesity epidemic in the United States. It is estimated that more than one-third of Americans are obese. See Ogden et al., 2014, "Prevalence of Childhood and Adult Obesity in the United States, 2011-12," Journal of the American Medical Association 311:806-814, the entire disclosure of which is herein incorporated by reference.

One example of a healthy drink option is a smoothie. A smoothie is a blended beverage generally made from fruit and vegetables. Often smoothies include liquid ingredients such as milk, cream, or juice. They may also include crushed ice, yogurt, peanut butter, soy, whey powder, and other supplemental ingredients. Smoothies provide a way to consume large amounts of natural ingredients, and are a good source of dietary fiber and other vital nutrients for a balanced diet. Another attractive attribute of smoothies is that they can be tailored to the particular needs and tastes of the individual. Nutritional supplements can be added as desired, and a smoothie can be a healthy meal in itself.

Although smoothies are a healthy food option, they are not always convenient. Making a smoothie is difficult because it requires specialized equipment, and it requires the user to have many perishable ingredients on hand. Significant amounts of perishable food are wasted by consumers who buy produce and cannot use it before it goes bad. Additionally, cutting fruits and vegetables to prepare the smoothie is time consuming and messy. Unlike many other foods, those shortcomings cannot be solved simply by preparing large batches of smoothies ahead of time. Since a smoothie is generally a partially frozen blend of ingredients, it loses its consistency over time due to melting. Also, smoothies are, optimally consumed when freshly made, or else certain nutrients will deplete or the smoothie may develop off-flavors.

SUMMARY

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

Conventional smoothie retailers require large overhead, frequent fresh fruit delivery, high costs associated with refrigeration, and skilled workers to make smoothies and recommend products to fit a customer's nutritional needs. Described herein, among other things, are systems and methods which can those problems by making smoothies available in a vending machine or other smaller or self-serve format, thereby providing a superior product while requiring fewer costs. Such a self-contained system can perform all of the functions of a traditional brick-and-mortar smoothie vendor. In other words, the systems and methods disclosed herein will preferably do at least each of the following: store the fruit and other fresh ingredients; receive an order from a customer; make a recommendation to a customer; combine ingredients; blend a smoothie; clean the blending equipment; indicate when supplies are low; and receive a payment.

Described herein are methods and systems for conveniently producing fresh smoothies, which can be tailored to the particular nutritional requirements and desires of the individual customer. The systems and methods are generally described via an embodiment which provides a vending machine for smoothies. It allows a consumer to select ingredients and other options, and provides a freshly-made smoothie in a short amount of time. It includes a user input apparatus for receiving orders and customer preferences, and then makes a smoothie to order, delivers the smoothie to the customer, and cleans the blending device.

There is described herein, among other things, a system for producing a smoothie. The system includes a refrigerated enclosure and a compartment for storing frozen fruit and/or vegetables disposed within the enclosure. A staging area, which may be in the shape of a funnel, is disposed beneath the fruit compartment, and a blender shaft is positioned vertically within the enclosure. The blender shaft includes a blender head at its bottom end, which extends through the staging area. The staging area may be configured to support a cup. The system also includes a compartment for storing a liquid ingredient. The system also includes a computer subsystem comprising a processor coupled to a memory device. The computer subsystem is operable to cause the liquid ingredient to be transferred into the cup and to cause the fruit from the fruit compartment to be released into the cup. The computer subsystem is further operable to cause the blender head to be lowered into the cup and to cause the fruit and liquid ingredient to be blended in the cup into a smoothie.

In certain embodiments, the system includes a refrigeration unit connected to the enclosure and the liquid ingredient compartment. The refrigeration unit may be configured to maintain a temperature within the enclosure between about −18 and −23 degrees C., and to maintain a temperature within the liquid ingredient compartment between about 0 and about 4 degrees C.

In some embodiments, the fruit compartment includes a dispensing system such as, but not limited to, an auger for conveying fruit out of the fruit compartment and into the staging area. The system may include a plurality of fruit compartments arranged next to the staging area. In an embodiment, these may be concentrically around the blender shaft. The liquid ingredient compartment may be configured to transfer the liquid ingredient into the cup, or it may be configured to transfer the liquid ingredient into the cup without the liquid contacting the staging area. In certain embodiments, the system includes a compartment for storing a nutritional supplement, and the system may be operable to release the nutritional supplement into the cup.

The system may also include a rotating vending door and a robotic arm and/or other conveying system in the staging area. The robotic arm may be configured to position the cup beneath the funnel and to transfer the cup to the rotating vending door. The system may include a rotary conveyor in the staging area for positioning the cup and transferring the cup to the rotating vending door. In some embodiments, the system includes a cleaning mechanism. The cleaning mechanism may include a cleaning reservoir.

In embodiments, the system includes an interactive touchscreen configured to display options for operating the system and accept an input from a user. The computer subsystem may be configured to communicate electronically with a smartphone to receive data from a user, design a smoothie recipe based on the data, and produce the smoothie according to the recipe. In some embodiments, the computer system can also store payment information from the user, calculate a fee based on the recipe, and charge the fee to the user.

There is also described herein a method for producing a smoothie. The method may include providing a smoothie vending system, which includes a refrigerated enclosure, a compartment for storing frozen fruit and/or vegetables disposed within the enclosure, a compartment for storing a liquid ingredient, a staging area, which may be in the shape of a funnel, disposed beneath the fruit compartment, a blender shaft disposed vertically within the enclosure and having a top end and a bottom end, wherein the blender shaft comprises a blender head at its bottom end, which extends through the staging area and a staging area configured to support a cup. The method also includes transferring the liquid ingredient into the cup and releasing the fruit from the fruit compartment into the cup. The method also includes lowering the blender head into the cup and blending the fruit and liquid ingredient in the cup into a smoothie.

In some embodiments, the method involves refrigerating the enclosure to a temperature between about −18 and −23 degrees C. and refrigerating the liquid ingredient compartment to a temperature between about 0 and about 4 degrees C.

In certain embodiments of the method, the smoothie vending system comprises a plurality of fruit compartments arranged next to the staging area which may be concentrically around the blender shaft. The fruit compartment may include a dispensing system such as, but not limited to, an auger, and the method may include conveying fruit out of the fruit compartment and into the staging area using the auger. The smoothie vending system may also include a compartment for storing a nutritional supplement, and the method may involve releasing the nutritional supplement into the cup. In some embodiments, the method includes transferring the liquid ingredient into the cup includes transferring the liquid ingredient into the staging area or transferring the liquid ingredient into the cup without the liquid ingredient contacting the staging area.

In some embodiments, the smoothie vending system includes a rotating vending door and a robotic arm in the staging area. The method may involve using the robotic arm and/or other conveying system to position the cup and to transfer the cup to the rotating vending door. The smoothie vending machine may include a rotary conveyor in the staging area, and the method may involve using the rotary conveyor to position the cup and to transfer the cup to the rotating vending door. In embodiments, the smoothie vending system also includes a cleaning mechanism. The cleaning mechanism may include a cleaning reservoir.

In some embodiments of the method, the transferring, releasing, lowering, and blending steps are performed by a computer system, which includes a processor coupled to a memory device. The method may further involve using the computer system to display options on a touchscreen for operating the smoothie vending system and to accept an input on the touchscreen from a user. In embodiments, the method includes using the computer system to communicate with a smartphone to receive data from a user, using the computer system to design a smoothie recipe based on the data, and producing the smoothie according to the recipe. The data received from the user may include user nutrition data, user preference data, or user goal data. In some embodiments, the method involves storing ring payment information from the user, calculating a fee based on the recipe, and charging the fee to the user.

There is also described herein, in an embodiment, a system for making blended beverages, such as smoothies, prepared by any of the methods described herein.

There is also described herein, in an embodiment, a method for cleaning a smoothie machine. The cleaning method involves filling a cleaning reservoir with hot water and/or a sanitizing solution, agitating the hot water and/or sanitizing solution with a blender head, replacing the hot water and/or sanitizing solution in the reservoir with cold water, agitating the cold water with the blender head, and exposing the blender head to an ultraviolet light.

In certain embodiments, the replacing step of the cleaning method involves draining the hot water and/or sanitizing solution from the reservoir and filling the reservoir with cold water. In some embodiments, the hot water, sanitizing solution, and/or cold water are moved to a waste water holding tank after use. In certain embodiments of the cleaning method, the hot water has a temperature greater than 90 degrees C. and the cold water has a temperature below 15 degrees C.

The method may also include lowering the blender head into the reservoir before the first agitating step, raising the blender head out of the reservoir before the replacing step, lowering the blender head into the reservoir before the second agitating step, and raising the blender head out of the reservoir before the exposing step.

DETAILED DESCRIPTION OF THE PREFERRED EMBODIMENT(S)

Generally speaking, traditional vending machines provide an automated platform for selling goods. Often those goods have low unit sales prices, making them unattractive for conventional merchandizing. Vending machines thus create a cost-effective way to merchandize those products while avoiding pilferage. See, e.g., U.S. Pat. No. 3,800,932, the entire disclosure of which is herein incorporated by reference. Typical vending machines dispense prepackaged (i.e., not freshly-made) goods. Less common are vending machines that prepare fresh meals to order. See, e.g., U.S. Pat. No. 7,303,093, the entire disclosure of which is herein incorporated by reference.

Systems described herein are generally configured to store fresh natural ingredients and provides made-to-order cold smoothies. This simplifies the purchase, production, and distribution of smoothies in several ways, and it eliminates the need for personnel to operate a store and maximizing space efficiency. These systems can provide healthy choices for the vending, machine market, increasing the variety of consumables available to customers and fulfilling a previously unmet need. Additionally, these systems make smoothies available in locations that conventional brick-and-mortar smoothie retailers are unable to reach, such as in offices or school hallways.

In the systems and methods and systems for producing, smoothies, the smoothies generally can be tailored for individual customers based on their nutrition and taste preferences. An on-demand machine for making smoothies is provided, allowing a user to create a customized made-to-order smoothie. The smoothies may be made in response to a vending transaction, e.g. where the system operates automatically when it receives payment from a user in any manner known to one of ordinary skill in the art, or may operate in a semi-autonomous manner where it is operated by a human initially but performs many of the steps without human intervention. In the latter arrangement, the human user may, for example, trigger the system to start, select ingredients to be used in the smoothie, select a resultant smoothie size, select a stored smoothie recipe from a memory on-board the machine, and/or provide other initial instructions with the smoothie machine then operating on those instructions autonomously to produce the smoothie. Generally, the systems include a refrigerated unit, compartments for storing ingredients, mechanisms for delivering ingredients into a cup, a blending apparatus for blending the ingredients into a smoothie in the cup, a cleaning module for cleaning components of the machine, and a computer including a processor, a memory, and a user interface for controlling the peripheral components of the system. Smoothie can be made to order, delivered the smoothie to the customer, and the blending device cleaned.

Figure 1:
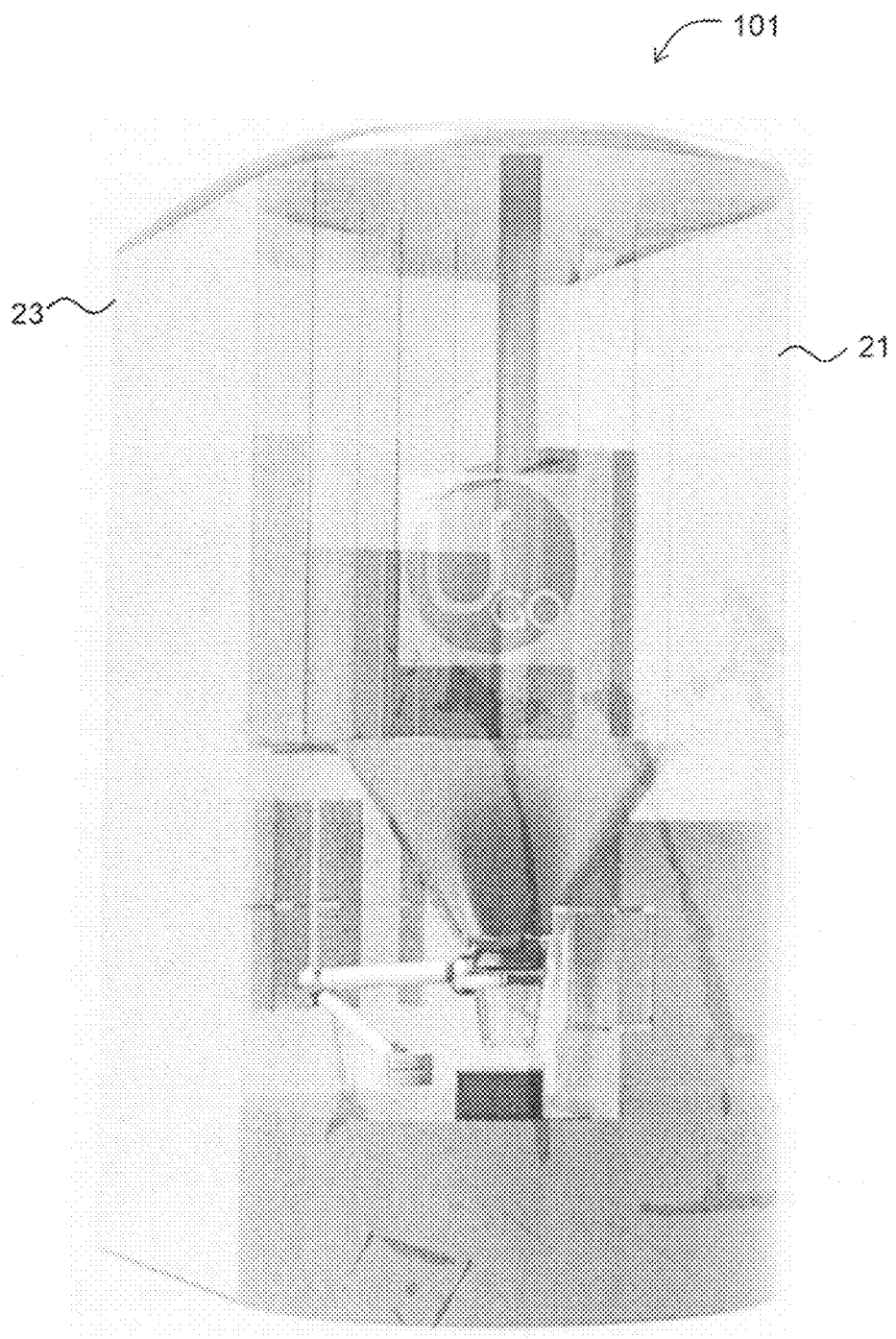
FIG. 1 shows an embodiment of a system for producing a smoothie.
Figure 2:
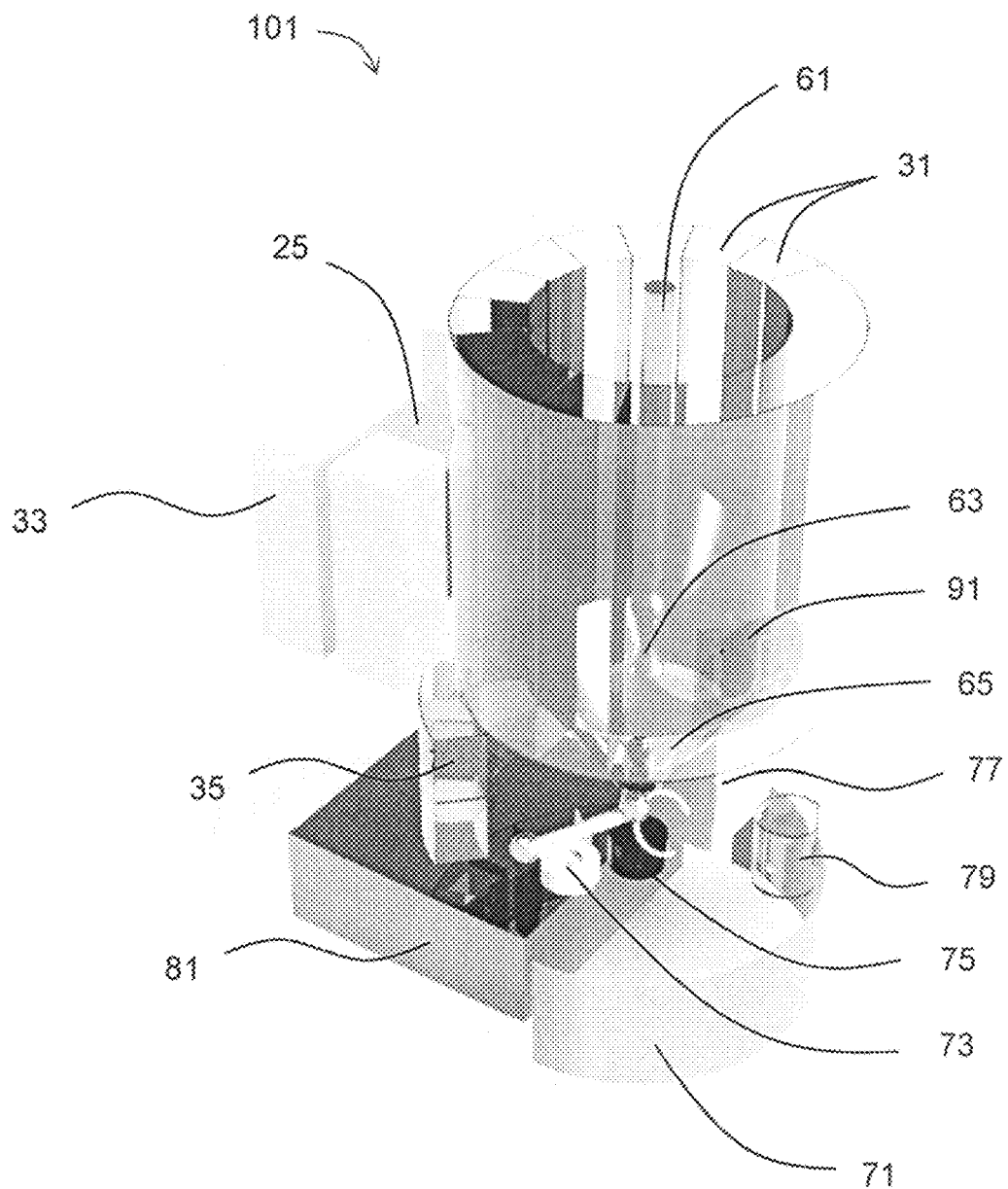
FIG. 2 shows a view of the system of FIG. 1 with outer portions removed to show some of the inner components of the machine.
Figure 3:
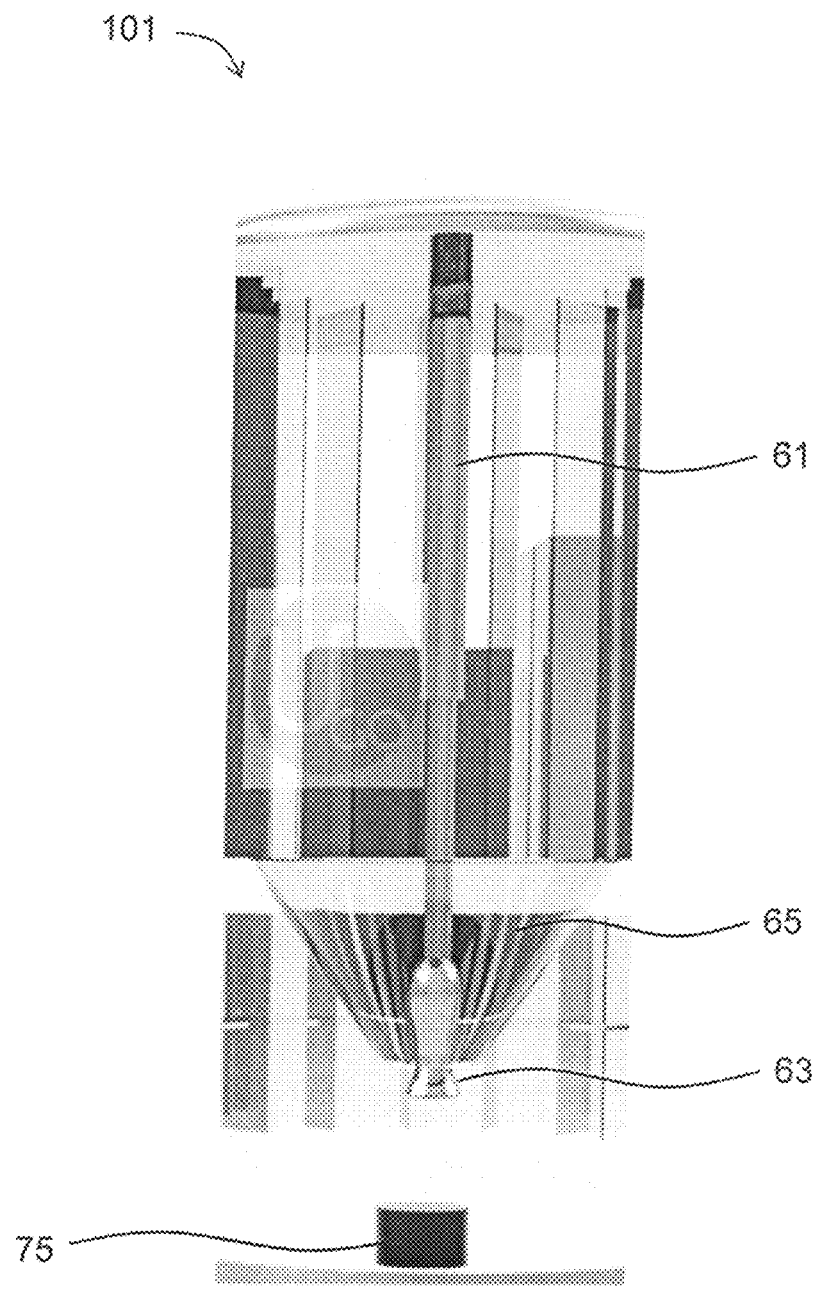
FIG. 3 shows a front view of the system of FIG. 1 with several of the components removed to give a greater detail of the blending mechanism.

FIGS. 1-3 show an embodiment of a system (101) for producing a smoothie. The system (101) includes a transparent casing (21) coupled to a control cabinet (23) as shown in FIG. 1. The casing (21) can be made of any resilient transparent material such as plastic, glass, thermoplastic, acrylic, polymer, or any other material known in the art to be suitable for enclosing a refrigerated area. The casing (21) defines an enclosure that contains many of the functional parts of the system, described in greater detail below. The control cabinet (23) connected to the casing (21) contains a refrigeration unit (not shown) that is operable to maintain a temperature within the enclosure, or at least a portion of the enclosure designed to house refrigerated components between about 0 degrees about 4 C. The refrigeration unit may also provide an additional portion which is maintained preferably between about −18 degrees C. and −23 degrees C. In operation, this frozen portion of the enclosure contains frozen fruit and vegetable ingredients for production of smoothies.

FIG. 2 shows a view of system (101) with outer portions removed to show some of the inner components of the machine. The system (101) includes a series of solid food compartments (31) which, in this embodiment, are arranged concentrically around a blender shaft (61). In a preferred embodiment, these solid food compartments are maintained at a frozen temperature, e.g. between about −18 to about −23 degrees C. In the depicted embodiment, the solid food compartments (31) are divided by walls made of a resilient material that may be the same material as the casing. It will be understood to a person of ordinary skill in the art that although the compartments (31) are referred to as containing fruit, one or more of the compartments can also contain frozen vegetables, ice, or other frozen food items that could be mixed into a smoothie. For ease of reference, the contents of those compartments (31) will be referred to as fruit throughout the disclosure. In a preferred embodiment, the invention uses frozen fruit rather than raw fruit in order to enhance freshness and flavor. Frozen fruits are generally healthier than raw fruit because they are packaged when the fruit has achieved peak ripeness and nutritional content. However, any type of fruit and vegetable can be used, and a person skilled in the an would understand obvious modifications to the system such as modifying refrigeration/freezing temperatures in at least some of the solid food compartments to allow non-frozen fruit to be used with the invention.

The contents of the solid food compartments (31) are visible to a user, due to the transparent casing. The solid food compartments (31) are generally open to the bottom, but include a conveyance means, which holds the fruit in place and is operable to convey a portion of fruit out through the bottom of the compartment (31) as needed. The dispensing system may be an auger conveyor (not shown), which rotates to release a portion of fruit from the compartment (31).

The compartments (31) may include a mechanism for tracking ingredient levels. The system can, for example, use machine vision to provide automated inspection and analyze remaining ingredients and determine when more are needed. Computer systems of the invention (described in greater detail below) can send a signal to a central server to initiate maintenance or refills of ingredients. The ingredient levels can also be tracked by load cells. A load cell is a transducer that can create an electrical signal in proportion to an applied force. Load cells can be positioned in the compartments (31) to measure the remaining ingredients based on the force applied by their weight.

The system (101) includes several liquid ingredient compartments (33), for storing liquid ingredients, which may include milk, juice, yogurt, water, soy milk, almond milk, coconut milk, and other similar ingredients. The liquid ingredient compartments (33) are preferably maintained at a temperature below 10 degrees C. and preferably between about 0 degrees C. and about 4 degrees C., in order to maintain freshness of the ingredients and also for creating an optimal smoothie texture and consistency. The temperature within the enclosure containing the solid food compartments (31) and the temperature within the liquid ingredient compartments (33) are controlled by the refrigeration unit (25).

The system (101) also includes a supplement storage compartment (35), which may contain nutritional supplements for including in a smoothie. Nutritional supplements may include whey protein, energy boosters, cacao, coconut, chia seeds, Spirulina, wheat germ, maca, other assorted nuts and seeds, and other nutritional substances known in the art. In operation, the supplements are inserted into the cup for inclusion with the smoothie.

At the bottom end of the blender shaft (61) is a blender head (63). The blender head (63) may comprise a spinning blade, optionally situated inside a housing, or any other type of blending mechanism. The blender head (63) may generally be an immersion blender or a propeller grinder. The spinning blade or grinder may be connected to a power source by a torque member positioned axially within the blender shaft (61). Alternatively, the blender shaft (61) may itself rotate to create a blending action in the blender head (63) or touchless blending systems such as electromagnets may be used to drive the blender head (63). The blender head (63) is operable to grind, mix, blend, and otherwise emulsify the ingredients into a smoothie.

A staging area, which in the depicted embodiment of FIG. 2 is a funnel (65), is positioned beneath the bottom extremities of the solid food compartments (31). The staging area is made of non-stick materials, such as anodized aluminum or silicone. When the staging area is the funnel (65), the staging area has a wide mouth facing upward to catch fruit ingredients that are released from the solid food compartments (31). The funnel (65) has a narrow mouth pointing downward to direct the fruit ingredients into as cup (not shown) below. However, alternative shapes of the staging area can be provided in alternative embodiments.

The blender shaft (61) is oriented vertically such that it its axis is aligned with the mouths of the staging area. The blender shaft (61) is retractable. As depicted in FIG. 2, the blender head (63) is not in use, and it is therefore in a first position where it is withdrawn from the funnel (65). During blending, however, the blender shaft (61) is configured to extend downward through the staging area into a second position such that the blender head (63) is beneath the lower extremity of the staging area.

Disposed beneath the funnel (65) may be a further portion of the staging area, which is generally defined by the curved front wall (71). The staging area includes a robotic arm (73) or other conveyor system of a type known to one of ordinary skill in the art. The robotic arm (73) is generally a mechanical arm, which is programmable to perform certain functions. The arm (73) may include multiple segments, each connected by a joint, to allow rotational and translational movement. At the end of the robotic arm (73) is an end effector having a gripping mechanism. The gripping mechanism may be a clamp, a ring, or any other surface capable of holding a cup. The robotic arm (73) is operable to pick up a cup, position it beneath the funnel, hold the cup in place without the cup tipping over during blending, transfer the cup to a lid sealer (77) and place the cup in a rotating vending door (79). The lid sealer (77) places a film cover on the cup before the smoothie is delivered to the user. The film cover may be heated for adhesion to the cup.

In alternative embodiments, the staging area includes a conveyor system. The conveyor system may include one or more belts which rotate across wheels or spools. Conveyor belt systems are known in the art (see, e.g., U.S. Pat. No. 3,486,607, the entire disclosure of which is herein incorporated by reference), and can be modified to achieve the purposes of the present system for moving the cup as described above. In some embodiments, the conveyor system may include a substantially circular plate configured to rotate on an axis, similar to a Lazy Susan. The plate may support the cup and allow translational movement of the cup to and from various locations in the staging area. The plate may have ridges or similar features to guide cup placement and prevent cups from tipping over. In some embodiments, the conveyor system comprises a star wheel conveyor. See, e.g.; U.S. Pat. No. 5,082,105, the entire disclosure of which is herein incorporated by reference. The conveyor system can be configured to move the cup from a cup storage location into position for blending, and then move the cup to a rotating vending door (79) for delivery to the user.

Turning back to FIG. 2, in order to deliver the smoothie to the customer, the cup is placed in the rotating door (79). The rotating door allows the smoothie to be transferred out of the refrigerated enclosure without significant transfer of air between the enclosed refrigerated environment and the warmer outside environment. The rotating door (79) is generally cylindrical and is open to one side. It is situated in an opening in the casing (21), such that when it is in a closed position, the solid portion of the rotating door (79) seals the opening in the casing (21) to prevent cold air from escaping the enclosure. In the closed position the rotating door is configured to accept a cup from the robotic arm (73), and then rotate such that the open portion of the rotating door overlaps with the opening in the casing (21), thereby making the smoothie accessible from the outside, allowing a customer to pick it up.

The system (101) also includes a touchscreen (91), which may include a transparent OLED touchscreen interface. The touchscreen (91) allows the user to interact with the machine. The user can choose particular ingredients or options on the touchscreen (91). The touchscreen (91) also takes payment information. Upon ordering a smoothie on the touchscreen (91), the machine initiates production of the smoothie. Because the casing (21) is transparent, most of the functions of the machine are visible to the user. The robotic arm (73) positions a cup beneath the funnel (65). Liquid ingredients and optionally supplemental ingredients are inserted into the cup from compartments (33) and (35) based on the chosen recipe. Also based on the chosen recipe, the solid food compartments (31) release the appropriate types and amounts of fruits and vegetables, which are directed into the cup via the funnel (65). The blender head (63) descends through the funnel (65) and into the cup. The blender head (65) blends the contents of the cup into a smoothie. Once blended, the blender head (63) ascends out of the cup, and the robotic arm (73) moves the cup to the lid sealer (77) where a film cover is placed on the cup. The cup is then transferred to the rotating door (79) and released by the robotic arm (73). The rotating door (79) rotates to expose the cup to the outside, where the customer is able to take the smoothie.

After a smoothie is made and distributed to the customer, the system (101) may initiate a cleaning mechanism. Because the smoothie is blended directly in the cup, generally the only part of the system (101) that directly contacts the smoothie is the blender head (63). The cleaning mechanism includes the cleaning reservoir (75). The cleaning reservoir (75) is disposed beneath the funnel and in alignment with the blender shaft (61). To clean the blender head (63), the reservoir (75) is filled with hot water and/or a food-safe sanitizing solution. The water may be, for example, above 80 degrees C. In embodiments, it may be above 90 degrees C. In some embodiments, it may be boiling water. The sanitizing solution may be any solution suitable for sanitizing food preparation equipment including but not limited to solutions of sodium hypochlorite (chlorine bleach), calcium hypochlorite, hydrogen peroxide, sodium percarbonate, sodium perborate, or any combination thereof. The blender head (63) descends into the reservoir (75) and into contact with the water and/or sanitizing solution. The blender head (63) is activated, thereby agitating the hot water or sanitizing solution and cleaning the blender head (63). The hot water or sanitizing is then drained via a hose connection (not shown) into a waste water holding tank (81), and the reservoir is filled with cold water. The cold water may be, for example, below 20 degrees C. or below 10 degrees C. The blender head (63) contacts the cold water, and blends it to remove residual food particles. The cold water is then disposed of in the holding tank (81). In some embodiments, where the machine is connected to plumbing, the system (101) may exclude the holding tank (81) and instead direct the waste water to a drain.

The blender head (63) can then be raised and exposed to a shielded ultraviolet light (not shown) to further sanitize it. The UV light exposure can last for a short period of time such as 1 to 5 seconds, or longer period of time, such as 30 seconds, 60 seconds, or more. The UV light is shielded so that users of the machine are not exposed to it.

Regardless of the specifics of the cleaning process which is performed, some form of cleaning of the blender head (63) or any other blending mechanism which has been in contact with the smoothie, will preferably take place after each and every smoothie is prepared and will remove all food particles from the blending mechanisms. In an embodiment, exposure to hot water is used after every smoothie, but a sanitizing solution is only provided only periodically. This can be, for example, after every smoothie, after every other smoothie, or after every fifth smoothie. Alternatively, the sanitizing solution may be provided in accordance with a timed cleaning regime and may occur every few minutes, once an hour, or a couple of times a day regardless of how many smoothies have been prepared. In a still further embodiment, a combination of timed and smoothie based periodicity may be used to select the sanitizing times. The system (101) may also have components other than the blending mechanisms cleaned at periodic intervals. For example, the system (101) may be completely cleaned and/or sanitized either manually or via an automatic cycle once a day.

FIG. 3 shows a front view of system (101) with several of the components removed to give a greater detail for the blender head (63), the motorized blender shaft (61), the funnel (65), and the cleaning mechanism beneath. In FIG. 3 the blender head (63) is in the second position, i.e., it is descended beneath the level of the narrow mouth of the funnel (65). During blending, a cup would be placed between the funnel and the location of the cleaning reservoir (75).

The invention provides a cleaning mechanism to clean the machine between uses with only a small amount of water. Cleaning of the machine is made easier because few components of the system come into contact with the smoothie. During the cleaning phase, the blender shaft (61) lowers the blender head (63) into the cleaning reservoir (75), and cleaning proceeds as described above. In alternative embodiments, the cleaning reservoir (75) can be raised to the level of the blender head (63). Alternatively, cleaning may involve a spray nozzle (not shown) to spray water onto the blending components and/or the funnel (65).

Figure 4:
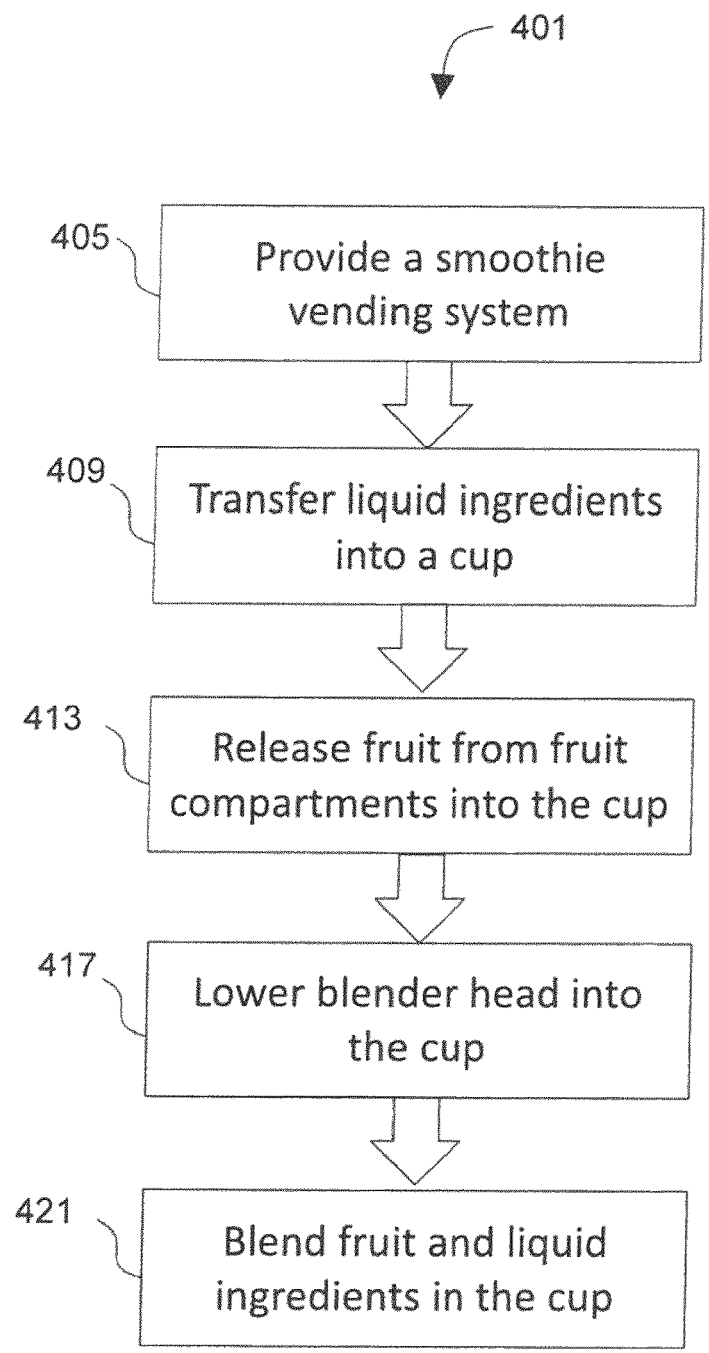
FIG. 4 shows an embodiment of a method for producing a smoothie.

FIG. 4 shows a method (401) for producing a smoothie, according to an aspect of the present disclosure. The method (401) involves providing (405) a smoothie vending system. Any smoothie vending system of the present disclosure can be used. The system includes a refrigerated enclosure, compartments for storing frozen fruit, frozen vegetables, or other solid foods, compartments for storing liquid ingredients, and a funnel for directing ingredients into a cup. The system also includes a blender shaft with a blender head which can extend through the funnel, and a staging area beneath the funnel for supporting a cup. Solid food ingredients can also be provided in a prepackaged cup (which may be the cup in which the smoothie is made) in an alternative embodiment.

The method (401) further includes transferring (409) liquid ingredients into a cup and releasing fruit or other solid foods (413) from the one or more solid food compartments into the cup via the funnel or otherwise getting them into the cup from a prepackaged state. The method (401) further includes lowering (417) the blender head into the cup and blending (421) the fruit and liquid ingredients in the cup into a smoothie.

Optionally, the method may include refrigerating the fruit compartments and the liquid ingredient compartments. The method may also include adding a nutritional supplement into the cup. In some embodiments, the method involves using a computer system to perform the steps of the method.

Aspects of the invention can be implemented by a specialized computer device. The system described above may include an internal computer that has a processor and a non-transitory memory. The memory can include recipes for smoothies and instructions for carrying out the recipes using the machine.

Figure 5:
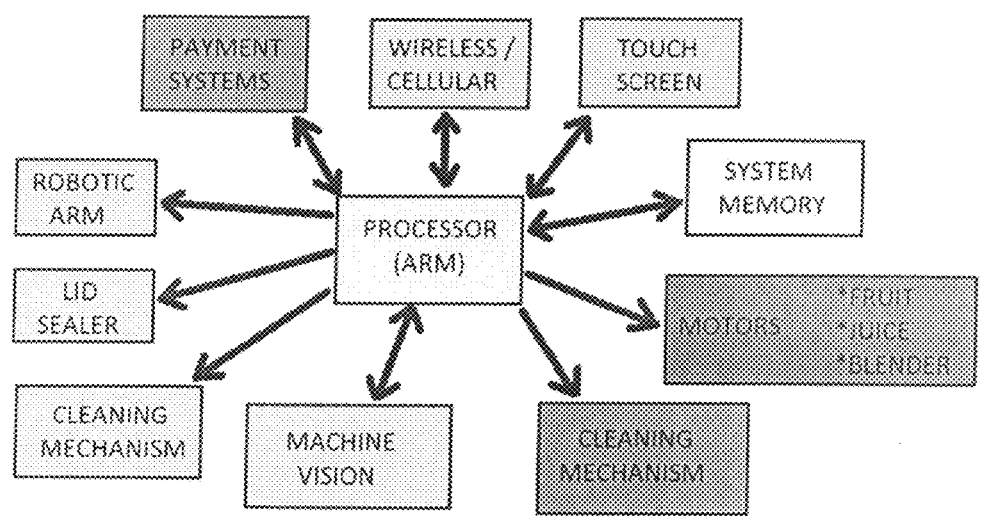
FIG. 5 shows an embodiment of a flowchart of signal communication between a processor and the other components of the system.

FIG. 5 shows a flowchart (501) of signal communication between a processor and the other components of the system. The system may include an ARM processor (available from ARM Holdings plc, Cambridge, England). ARM processors have reduced instruction set architectures, which reduces cost, heat, and power usage by the processor.

As shown in FIG. 5, the processor can control the system's peripheral devices and motors. The processor is connected to a memory, which stores instructions for operating the mechanical parts of the machine. The memory also stores recipe information, ingredient levels, user information, and other operating instructions. The processor can track purchases and implement algorithms stored in the memory for designing smoothie recipes and making smoothie recommendations based on stored user preferences, nutritional needs, and other inputs. The computer tracks device status id can signal when maintenance is required. The system can send information to a central server, allowing remote tracking of machines. The processor can share information with other computers, including smartphones. Users can interact with the processor from a remote computer or a smartphone via a mobile application to pre-order smoothies and remit payments.

Figure 6:
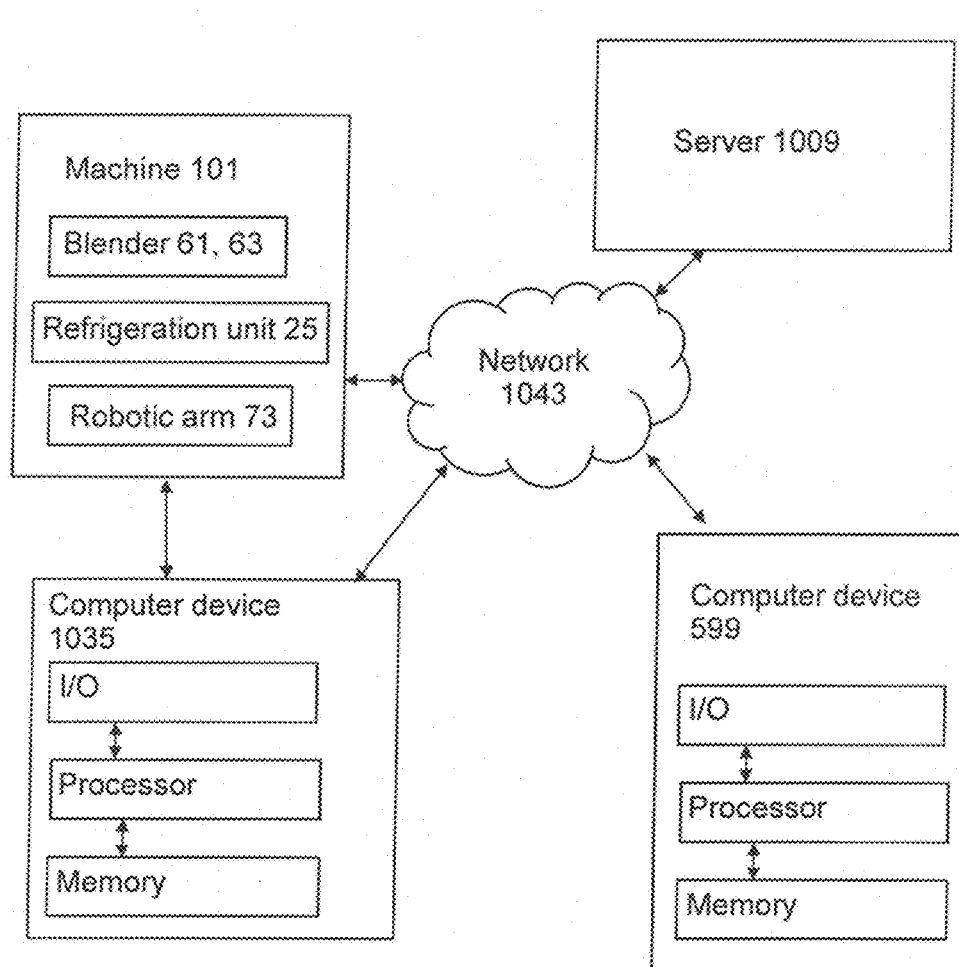
FIG. 6 diagrams an embodiment of a system for control and use of smoothie machine.

FIG. 6 diagrams a system (601) for control and use of smoothie machine (101). Smoothie machine (101) is connected directly or via network (1043) to computer device (1035). Optionally, system (601) may include or access a server computer (1009). The machine (601) provides a system for producing a smoothie. The system includes a computer (1035). The machine (101) preferably includes at least motorized blender shaft (61), blender head (63), refrigeration unit (25), and robotic arm (73). Computer device (1035) includes a touchscreen configured to display instructions for operating machine (101). Using system (601), a user may touch the touchscreen to select options for a smoothie, input preferences, input payment information, or log in to an account. The computer (1035) can control the machine (101) to produce a smoothie in response to the user touching the touchscreen. Additionally, or alternatively, the system (601) may include or access a computer device (599), which may be a smartphone or another computer at a remote location. A user can use the computer device (599) to operate the machine (101).

Unless otherwise indicated, all numbers expressing quantities, measurements, temperatures, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member ma be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Furthermore, references have been made to patents and printed publications throughout this specification. Each of the above-cited references and printed publications are individually incorporated herein by reference in their entirety.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment baying defined values for each of the components, as given herein throughout. Further, ranges provided for a genus or a category can also be applied to species within the genus or members of the category unless otherwise noted.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one mbodiment of the presented method. Other steps and methods may be conceived, that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The invention claimed is:

1. A system for producing a smoothie, the system comprising, in combination:
   a refrigerated enclosure;
   a solid food compartment for storing a solid food ingredient disposed within the enclosure;
   a liquid compartment for storing a liquid ingredient;
   a blender shaft disposed vertically within the enclosure and having a top end and a bottom end, wherein the blender shaft comprises a blender head at its bottom end;
   a staging area supporting a cup; and
   a computer system comprising a processor coupled to a memory device;
   wherein the computer system:
   causes the liquid ingredient to be transferred into the cup;
   causes the solid food ingredient to be transferred into the cup;
   causes the blender head to be lowered into the cup; and
   causes the solid food ingredient and the liquid ingredient to be blended in the cup into a smoothie.

2. The system of claim 1, further comprising a refrigeration unit connected to the enclosure and the liquid ingredient compartment, and wherein the refrigeration unit maintains a temperature within at least a portion of the enclosure between about −18 and −23 degrees C., and to maintain a temperature within the liquid ingredient compartment between about 0 and about 4 degrees C.

3. The system of claim 1, wherein the solid food compartment comprises an auger for conveying the solid food out of the solid food compartment and into the staging area.

4. The system of claim 1, wherein the system comprises a plurality of solid food compartments arranged concentrically around the blender shaft.

5. The system of claim 1, wherein the liquid ingredient compartment transfers is configured to transfer the liquid ingredient into the cup via a funnel.

6. The system of claim 5, wherein the liquid ingredient compartment transfers is configured to transfer the liquid ingredient into the cup without the liquid contacting the funnel.

7. The system of claim 1, further comprising a compartment for storing a nutritional supplement, and wherein the computer system causes the nutritional supplement to dispense from the compartment for storing the nutritional supplement into the cup.

8. The system of claim 1, further comprising a rotating vending door.

9. The system of claim 8, further comprising a robotic arm in the staging area, the robotic arm configured to position the cup in the staging area and transfer the cup to the rotating vending door.

10. The system of claim 8, further comprising a rotary conveyor in the staging area, the rotary conveyor configured to position the cup in the staging area and transfer the cup to the rotating vending door.

11. The system of claim 1, further comprising a cleaning mechanism disposed beneath the staging area, the cleaning mechanism comprising a cleaning reservoir.

12. The system of claim 1, further comprising an interactive touchscreen:
displaying options for operating the system; and
accepting an input from a user.

13. The system of claim 1, wherein the computer system:
measures ingredient levels and system status;
determines when a refill or maintenance is needed; and
sending a signal to a server to initiate the refill or maintenance.

14. The system of claim 1, wherein the computer system:
communicates electronically with a smartphone to receive data from a user;
designs a smoothie recipe based on the data; and
produces the smoothie according to the recipe.

15. The system of claim 14, wherein the computer system:
stores payment information from the user;
calculates a fee based on the recipe; and
charges the fee to the user.

16. The system of claim 1 further comprising:
a second solid food compartment for storing a second solid food ingredient disposed within the enclosure;

wherein the computer system causes said second solid food ingredient to be transferred into the cup and to be blended into the smoothie in the cup.

\* \* \* \* \*